D. S. Alvord.
Seeding Mach.
No. 110,720. Patented Jan. 3, 1871.

Witnesses.
J. H. Burridge
Frank S. Alden

Inventor.
D. S. Alvord
C. D. Hollis

United States Patent Office.

D. S. ALVORD, OF AUSTINBURG, AND CHARLES D. HOLLIS, OF ASHTABULA, OHIO.

Letters Patent No. 110,720, dated January 3, 1871.

IMPROVEMENT IN SEEDING-MACHINES.

The Schedule referred to in these Letters Patent and making part of the same.

*To all whom it may concern:*

Be it known that we, D. S. ALVORD, of Austinburg, and CHARLES D. HOLLIS, of Ashtabula, in the county of Ashtabula and State of Ohio, have invented certain new and useful Improvements in Seeding-Machines; and we do hereby declare that the following is a full and complete description of the same, reference being had to the accompanying drawings making a part of this specification, in which—

Figure 1:
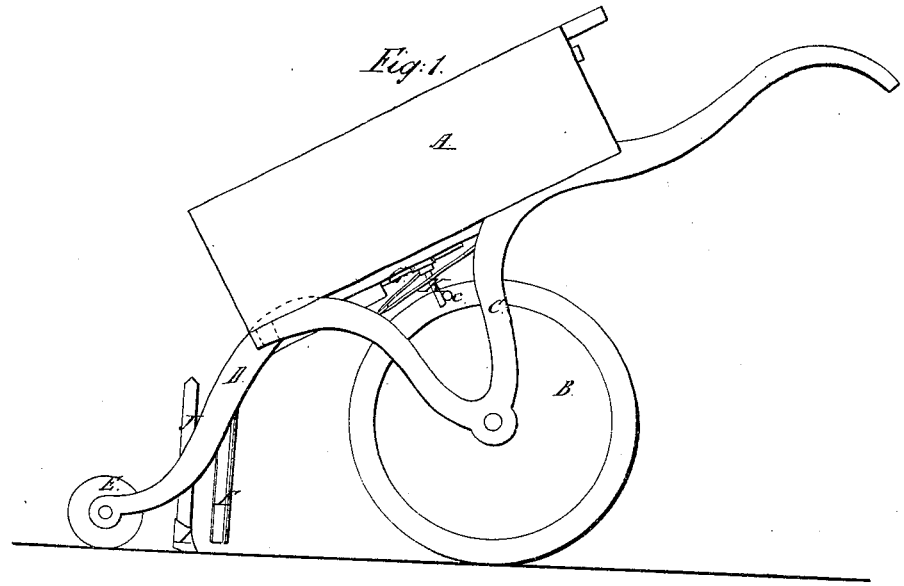

Figure 1 is a side view of the machine.

Figure 2:
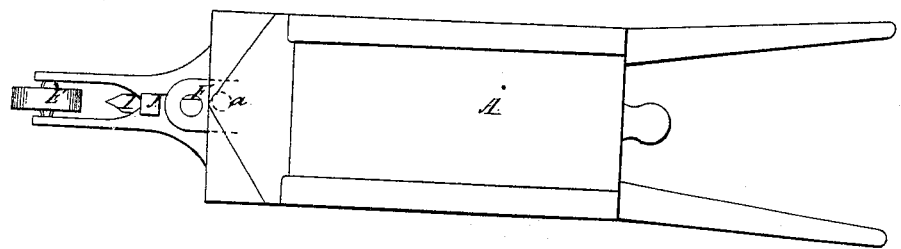

Figure 2, a view of the top.

Figure 3:
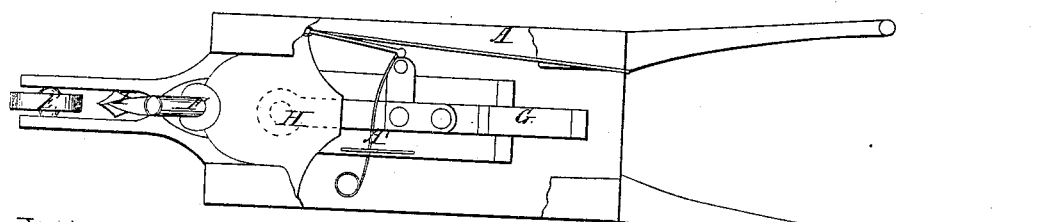

Figure 3, a view of the under side, with the wheel attached.

Like letters of reference refer to like parts in the several views.

This machine is for the purpose of planting corn or other grain and seeds so that an equal number of grains shall be dropped at regular and equal distances, in rows or hills.

In fig. 1, A represents a seed-box mounted upon a wheel, B, having its bearings in standards or stays C.

Proceeding from the front end of the box is an arm, D, in the extreme end of which is journaled a guide-wheel E.

F is a tube depending from the upper end of the arm, and communicates with the interior of the box by means of a channel or groove in which is fitted and works a slide, G, fig. 3.

In the front end of said slide is a cup or hole, H, of the same capacity as the hole in the bottom of the box, indicated by the dotted line *a*, fig. 2, and which also conforms in size to the bore of the tube.

I, fig. 1, is a share, fixed to the lower end of the standard J, said standard being attached to the arm D in advance of the tube, as shown in the drawing.

K is an arm proceeding from the slide down to and below the rim of the wheel B, where it is made to engage with a pin, *c*, projecting from the side of the wheel, for a purpose hereinafter shown.

The practical operation of this machine is as follows:

The grain being placed in the box referred to, the operator holds the machine by the handles and starts it off in the line of work, the guide-wheel resting upon the ground, as shown in fig. 1; as the machine moves forward the share plows a furrow, in which the end of the tube follows.

Now as the wheel B revolves, the pin *c* strikes against the arm K, thereby pushing along the slide, and carrying the cup or hole *a* to and over the mouth of the tube. The corn brought in the cup, some four or five grains, which is the holding capacity of the hole, will drop into the mouth of the tube and through that to the ground.

On the disengagement of the pin with the arm the slide is again thrown back, as shown in fig. 3, by the spring A'. The cup or hole is again filled from the box by being brought in proper relation to the outlet or opening in the box alluded to.

By this time the pin has made another revolution, which is equal to four feet, the distance apart that the corn is to be planted. The slide is again pushed forward, bringing the filled cup to the mouth of the tube, into which the corn is dropped as before, and from thence to the ground; and so on to the end.

It will be obvious that by this machine grain may be planted any distance apart less than four feet, the length of the circumference of the wheel, by simply introducing one or more additional pins in the rim of the wheel, so that the slide shall be operated more frequently as the wheel revolves. Hence corn, beans, peas, or other seeds may be planted very closely together, forming rows or drills instead of hills several feet apart.

What we claim as our invention, and desire to secure by Letters Patent, is—

The arrangement of the seed-box A, wheel B, curved arm D, guide-wheel E, tube F, slide G, arm K, pin *c*, and spring A', as and for the purpose specified.

D. S. ALVORD.
        CHAS. D. HOLLIS.

Witnesses:
 W. H. BURRIDGE,
 THEODORE HALL.